US006832211B1

(12) United States Patent
Thomas et al.

(10) Patent No.: US 6,832,211 B1
(45) Date of Patent: Dec. 14, 2004

(54) SYSTEM AND METHOD FOR PRODUCING TECHNOLOGY-BASED PRICE TARGETS FOR A COMPANY STOCK

(75) Inventors: Patrick Thomas, Haddonfield, NJ (US); Francis Narin, Ventnor, NJ (US)

(73) Assignee: CHI Research Inc., Haddon Heights, NJ (US)

( * ) Notice: Subject to any disclaimer, the term of this patent is extended or adjusted under 35 U.S.C. 154(b) by 646 days.

(21) Appl. No.: 09/718,799

(22) Filed: Nov. 22, 2000

Related U.S. Application Data (63) Continuation of application No. 09/353,613, filed on Jul. 14, 1999, now Pat. No. 6,175,824.

(51) Int. Cl.$^7$ .............................................. G06F 17/60
(52) U.S. Cl. .............................. 705/36; 705/35; 705/37; 705/10
(58) Field of Search .............................. 705/35, 36, 37, 705/10

(56) References Cited

U.S. PATENT DOCUMENTS

| | | | |
|---|---|---|---|
| 5,761,442 A | | 6/1998 | Barr et al. |
| 5,812,988 A | * | 9/1998 | Sandretto ..................... 705/36 |
| 5,819,238 A | | 10/1998 | Fernholz |
| 5,934,674 A | | 8/1999 | Bukowsky |
| 5,978,778 A | | 11/1999 | O'Shaughnessy |
| 5,999,907 A | * | 12/1999 | Donner ......................... 705/1 |
| 6,035,286 A | | 3/2000 | Fried |
| 6,061,662 A | * | 5/2000 | Makivic ....................... 705/36 |
| 6,125,355 A | * | 9/2000 | Bekaert et al. ............... 705/36 |
| 6,556,992 B1 | * | 4/2003 | Barney et al. ................. 707/6 |

FOREIGN PATENT DOCUMENTS

WO     WO 9928845 A1 * 6/1999 .......... G06F/17/60

OTHER PUBLICATIONS

Buderi et al., Global Innovation: Who's In The Lead?: BW's New Ranking of Nearly 200 top companies tracks technological strength based on U.S. Patents, Business Week, Aug. 3, 1992, n 3277, p. 68.*

Cot et al. ; The Global Patent Race Picks Up Speed: BW's Rankings Reflect a Worldwide Surge of Interest in Winning U.S. Jackpot, Business Week, Aug. 9, 1993, n 3331, p. 57.*

Deng, Z., Lev, B., and Narin, F. "Science and Technology as Predictors of Stock Performance" (Financial Analysts Journal, vol. 55, No. 3, May/Jun. 1999, pp. 20–32).

Rosenberg, N. and Birdzell, Jr., L.E. "Science, Technology and the Western Miracle" (Scientific American, vol. 263, No. 5, Nov. 1990, pp. 42–54).

Griliches, Z. "Patent Statistics as Economic Indicators: A Survey" (Journal of Economic Literature, vol. XXVIII, Dec. 1990, pp. 1661–1707).

Narin, F. and Noma, E. "Patents as Indicators of Corporate Technological Strength" (Research Policy 16, 1987 pp. 143–155, North Holland).

Trajtenberg, M. "A Penny for Your Quotes: Patent Citations and the Value of Innovations" (Rand Journal of Economics, vol. 21, No. 1, Spring 1990, pp. 172–187).

(List continued on next page.)

*Primary Examiner*—Jagdish N Patel
(74) *Attorney, Agent, or Firm*—Akin Gump Strauss Hauer & Feld, L.L.P.

(57) ABSTRACT

Target valuations for company stocks are produced based on the strength and quality of their technology. The valuations are derived from a combination of indicators that measure the quality of companies' patented technology, and their commitment to research and development. Indicators may include citation indicators that measure the impact of companies' patents on later technological developments, the strength of the link between companies' patents and scientific research, the speed at which companies innovate, and the proportion of companies' sales spent on research and development. The technology-based valuation may be used to identify investment opportunities in the stock market.

27 Claims, 5 Drawing Sheets

OTHER PUBLICATIONS

Lev, B. and Zarowin, P. "The Boundaries of Financial Reporting and How to Extend Them" (Feb. 1998 pp. 1–51).

Albert, M.B., Avery, D., Narin, F. and McAllister, P. "Direct Validation of Citation Counts as Indicators of Industrially Important Patents" (Research Policy 20, 1991, pp. 251–259, North Holland).

Hall, B., Jaffe, A. and Trajtenberg, M. "Market Value and Patent Citations: A First Look" (Apr. 1998. Paper prepared for the Conference on Intangibles and Capital Markets, New York University, May 15–16, 1998, pp. 1–34).

Thomas, P. "The Effect of Technological Impact Upon Patent Renewal Decisions" (Technology Analysis & Strategic Management, vol. II, No. 2, 1999, pp. 181–197).

Carpenter, M.P., Narin, F., and Woolf, P. "Citation Rates to Technologically Important Patents"(World Patent Information, vol. 3, No. 4, pp. 160–163, 1981).

Breitzman, A., and Narin, F. "A Case for Patent Citation Analysis in Litigation" (The Law Works, Mar. 1996, vol. 3, No. 3, pp. 10–11, pp. 26–27).

Narin, F., Hamilton, K.S. and Olivastro, D. The Increasing Linkage Between U.S. Technology and Public Science (Research Policy 26, 1997, pp. 317–330).

Narin, F., "Tech–Line® Background Paper" (To be published in: "Measuring Strategic Competence", Version of Aug. 19, 1998, pp. 1–49).

Coy, P. "Can You Really Beat the Market?" (Business Week, May 31, 1999, pp. 144 and 146).

Stobbs Gregory; "Tuning the Corporate Patent Portfolio Using the Latest Software Tools", MapiT Briefing Report, Manning & Napier, Jun. 1997.

McGuire, Craig; "The Next Level of Proprietary Protection", Wall Street & Technology, Jan. 99, vol. 17, Issue 1, p52.

J.S. Perko, et al; "The Transfer of Public Science to Patented Technology: A Case Study in Agriculture Science", Journal of Technology Transfer, vol. 22(3), 1997.

"Techno File: Data Mining for the Soft Assets", Investor Relations, Dec. 1996.

"CHI Research, Inc. Introduces Tech–Line Analysis Tool Technology", Information Today, p. 66, 1999.

* cited by examiner

Fig. 1

| Name | Industry | No. Pats | Normed No. Pats | % Growth | Normed % Growth | CII | Normed CII | SL | Normed SL | TCT | Normed TCT | R&D Intensity |
|---|---|---|---|---|---|---|---|---|---|---|---|---|
| 3COM Corp. | Computers | 24 | 0.15 | 26.32 | 2.53 | 3.53 | 2.02 | 0.21 | 0.22 | 5.71 | 0.97 | 0.10 |
| A O Smith Corporation | Automotive | 11 | 0.17 | 175.00 | 157.15 | 0.83 | 0.81 | 0.00 | 0.00 | 9.64 | 1.25 | 0.02 |
| Abbott Laboratories | Pharmaceuticals | 184 | 3.57 | 55.93 | 31.43 | 1.14 | 1.60 | 3.36 | 0.55 | 8.05 | 0.92 | 0.11 |
| Actel Corp. | Semiconductors | 25 | 0.17 | 56.25 | 20.38 | 6.00 | 3.40 | 3.12 | 3.15 | 6.41 | 1.12 | 0.16 |
| ADC Telecommunications | Telecommunications | 10 | 0.07 | -9.09 | -29.52 | 0.96 | 0.50 | 2.40 | 1.64 | 8.03 | 1.46 | 0.11 |
| Adolph Coors Co | Food, Bev. & Tobacco | 8 | 0.25 | 60.00 | 46.71 | 0.48 | 0.54 | 0.00 | 0.00 | 16.75 | 1.63 | 0.01 |
| Advanced Micro Devices Inc. | Semiconductors | 183 | 1.23 | 34.56 | -1.31 | 2.14 | 1.21 | 0.97 | 0.98 | 5.34 | 0.94 | 0.21 |
| Air Products & Chemicals Inc | Chemicals | 81 | 1.36 | 8.00 | 5.15 | 0.98 | 1.36 | 0.95 | 0.60 | 8.58 | 0.89 | 0.03 |
| Albemarle Corp. | Chemicals | 25 | 0.42 | -10.71 | -13.57 | 0.58 | 0.81 | 0.92 | 0.58 | 12.63 | 1.31 | 0.04 |
| Allergan Inc | Health Care | 65 | 1.33 | 12.07 | -4.19 | 2.29 | 1.39 | 5.60 | 2.26 | 8.09 | 0.97 | 0.10 |
| Alliant Techsystems Inc | Aerospace | 13 | 0.19 | 62.50 | 58.08 | 0.49 | 0.64 | 0.62 | 0.87 | 13.67 | 1.40 | 0.01 |
| AlliedSignal Inc | Conglomerates | 226 | 3.92 | 0.00 | 0.41 | 0.83 | 1.08 | 0.96 | 1.53 | 9.99 | 1.05 | 0.02 |
| Altera Corp. | Semiconductors | 39 | 0.26 | 225.00 | 189.13 | 4.03 | 2.29 | 2.10 | 2.12 | 6.19 | 1.09 | 0.10 |
| Aluminum Company of America | Metals | 56 | 1.53 | 12.00 | 14.29 | 0.45 | 0.62 | 0.41 | 0.56 | 11.26 | 1.19 | 0.01 |
| Alza Corp | Pharmaceuticals | 28 | 0.54 | -15.15 | -39.65 | 0.98 | 1.38 | 3.71 | 0.61 | 10.76 | 1.23 | 0.07 |
| Amdahl Corp | Computers | 16 | 0.10 | 23.08 | -0.71 | 1.86 | 1.06 | 1.06 | 1.10 | 7.20 | 1.22 | 0.08 |
| American Home Products Corp | Health Care | 260 | 5.32 | 19.27 | 3.01 | 1.42 | 0.87 | 7.75 | 3.13 | 7.46 | 0.89 | 0.10 |
| American Telephone and Telegraph | Telecommunications | 144 | 1.00 | -2.04 | -22.47 | 2.33 | 1.22 | 0.49 | 0.34 | 7.24 | 1.32 | 0.09 |
| Amgen Inc. | Pharmaceuticals | 16 | 0.31 | 23.08 | -1.42 | 0.51 | 0.72 | 26.00 | 4.24 | 7.25 | 0.83 | 0.24 |
| Amoco Corp | Energy | 65 | 1.46 | 22.64 | 35.56 | 0.61 | 0.95 | 4.72 | 4.47 | 9.23 | 0.87 | 0.01 |

| Name | Ticker | Industry | Technology MTB 12/31/96 | Actual MTB 12/31/96 | Technology Percentile | Actual MTB Percentile | Valuation Percentile 12/31/96 | Price 12/31/96 | Price 12/31/97 | 1 Year Price Change (%) |
|---|---|---|---|---|---|---|---|---|---|---|
| RJR Nabisco Inc | RN | Food, Bev. & Tobacco | 3.90 | 0.97 | 80 | 1 | 100 | $34.00 | $37.50 | 10.29 |
| Walbrow Corp. | WALB | Automotive | 4.04 | 1.15 | 82 | 4 | 100 | $18.25 | $13.44 | -26.36 |
| Union Camp Corporation | UCC | Forest & Paper Prods. | 6.39 | 1.58 | 94 | 11 | 99 | $47.75 | $53.69 | 12.44 |
| Astec Industries | ASTE | Machinery | 3.23 | 0.96 | 67 | 1 | 99 | $4.75 | $8.38 | 76.42 |
| Apple Computer Inc. | AAPL | Computers | 3.60 | 1.34 | 75 | 6 | 98 | $20.88 | $13.13 | -37.12 |
| Donnelly Corp | DON | Materials | 3.68 | 1.42 | 77 | 8 | 98 | $19.60 | $16.81 | -14.23 |
| National Semiconductor Corporation | NSM | Semiconductors | 3.43 | 1.41 | 72 | 7 | 97 | $24.50 | $25.94 | 5.88 |
| Dexter Corp, The | DEX | Health Care | 6.92 | 2.00 | 96 | 20 | 97 | $31.88 | $43.19 | 35.48 |
| Millennium Chemicals Inc. | MCH | Chemicals | 3.12 | 1.04 | 62 | 2 | 97 | $17.75 | $23.50 | 32.39 |
| Quantum Corp. | QNTM | Computers | 4.03 | 1.79 | 81 | 15 | 96 | $14.31 | $20.06 | 40.18 |
| Advanced Micro Devices Inc. | AMD | Semiconductors | 3.80 | 1.75 | 79 | 14 | 96 | $25.75 | $17.75 | -31.07 |
| Wang Laboratories Inc | WANG | Computers | 4.63 | 1.98 | 86 | 19 | 95 | $20.25 | $22.13 | 9.28 |
| Trimble Navigation Ltd | TRMB | Electronics | 5.99 | 2.05 | 92 | 23 | 95 | $11.50 | $21.81 | 89.65 |
| Weyerhaeuser Company | WY | Forest & Paper Prods. | 5.06 | 2.04 | 88 | 22 | 94 | $47.38 | $49.06 | 3.55 |
| Applied Materials Inc | AMAT | Machinery | 4.11 | 2.01 | 83 | 21 | 94 | $17.97 | $30.13 | 67.67 |
| Integrated Device Technology Inc. | IDTI | Semiconductors | 3.16 | 1.60 | 64 | 11 | 94 | $13.63 | $9.44 | -30.74 |
| Westvaco Corp | W | Forest & Paper Prods. | 2.97 | 1.31 | 54 | 5 | 93 | $28.75 | $31.44 | 9.36 |
| Burlington Industries Inc | BUR | Textiles | 2.85 | 1.04 | 48 | 3 | 93 | $11.00 | $13.81 | 25.55 |
| Morton Int'l Inc | MII | Chemicals | 6.06 | 2.28 | 92 | 29 | 92 | $29.26 | $34.38 | 17.50 |
| Sensormatic Electronics Corporation | SRM | Electronics | 2.95 | 1.42 | 53 | 8 | 92 | $16.75 | $16.44 | -1.85 |

SYSTEM AND METHOD FOR PRODUCING TECHNOLOGY-BASED PRICE TARGETS FOR A COMPANY STOCK

RELATED APPLICATIONS

This application is a continuation of to U.S. patent application Ser. No. 09/353,613, entitled "Method and Apparatus for Choosing a Stock Portfolio, Based on Patent Indicators", filed Jul. 14, 1999, now U.S. Pat. No. 6,175,824 the contents of which are incorporated herein by reference.

BACKGROUND OF THE INVENTION

1. Field of the Invention

The present invention relates to a data processing system and method for producing company stock price targets using technology indicators. Specifically, a company stock target price is calculated based on a combination of technology indicators.

2. Prior Art

There is a growing awareness that the success of many companies is dependent, not only on the assets on the companies' balance sheets, but also on the investments that the companies make which do not appear in any financial statements. These intangible investments take many forms, including recruiting and training a highly skilled workforce, promoting brand awareness, and investing in technological innovation.

Investment in technological innovation is imperative for companies in many industries. As technologies develop, companies must innovate in order to keep up with the latest ideas. If they do not, there is a danger that they will be left behind by competitors who are developing more advanced and marketable products. This is especially true in hi-tech industries such as biotechnology, pharmaceuticals and telecommunications.

One way of analyzing a company's ability to innovate is through evaluation of its patent portfolio. There are a number of quantitative patent citation indicators available that measure the size, growth and quality of patent portfolios. These indicators may be used to identify companies with high quality patent portfolios relative to other companies in the same industry.

The underlying assumption in patent citation analysis is that a patent which is highly cited (i.e., is referred to by many subsequently issued patents) is likely to contain technological advances of particular importance. Studies have shown that patents related to invention awards are cited twice as often as other patents. Similarly, patents designated with Pioneering Patent status are cited much more often than average, as are patents accorded Hall of Fame status by the US Patent Office. Other studies have reported that patents seen as important by a company's staff were more frequently cited than patents they regarded as less important.

There is also evidence to suggest that patent citations may have some validity as a proxy for the commercial value of patents. One study has shown that patents regarded as commercially valuable by their owners are more highly cited than patents regarded as less valuable. In addition, highly cited patents are more likely to be renewed than patents that receive fewer citations. Given that patent assignees must pay a renewal fee at each renewal point, the decision to renew patents is an economic one. Patent assignees will only renew patents if they expect the commercial returns on those patents to exceed their renewal fee. The finding that highly cited patents are more likely to be renewed therefore suggests that patent assignees expect higher commercial returns from these patents.

A number of studies have also analyzed the relationship between patent indicators and company performance. Studies of seventeen US pharmaceutical companies uncovered a significant positive correlation between patent citation frequency, concentration of company patents in a few patent classes, and company profits and sales. A cross-sectional analysis of mechanical and electrical engineering companies found that by examining the number of patents granted, 12% of the sales growth in the mechanical engineering companies and 14% of new product announcements in the electrical engineering firms could be explained.

The relationship between technology indicators and company valuations has been tested. Findings indicate that patent measures reflecting the volume of companies' research activity, the impact of companies' research on subsequent innovations, and the closeness of research and development to basic science, were related to the stock market valuation of companies.

In view of the importance of the above-discussed patent citation analysis in a company's valuation, a need exists for a system and method which:

(i) employs patent indicators that are normalized to account for differences between patent citation patterns across industries, such that companies in different industries can be compared; and (ii) produces useful valuations of individual companies using technology indicators.

Despite the obvious attractiveness of using technology indicators in stock market analysis, there are some formidable barriers to using these techniques in stock selection. Perhaps the most important of these barriers is the problem of matching patent assignee names to individual companies. This is because companies patent under many different names, such as divisional and subsidiary names. In addition, large numbers of patents are reassigned from one company to another, for reasons such as mergers and acquisitions. Assignee unification is therefore a useful first step in the application of patent citation analysis.

BRIEF SUMMARY OF THE INVENTION

A computer-implemented process is provided for generating technology-based valuations of companies' shares. The process includes producing a technology-based market-to-book valuation using the formula:

$$\text{Technology } MTB = a + b1 NUMPAT + b2 \text{ GROWTH} + b3 CII + b4 SL + b5 TCT + b6 R\&D$$

where NUMPAT, GROWTH, CII, SL, TCT and R&D are company technology indicators, and a, b1, b2, b3, b4, b5 and b6 are weighting coefficients. Using the formula:

$$\text{Technology Stock Price} = (\text{Technology } MTB/\text{Actual } MTB) \times \text{Current Stock Price}$$

a target valuation is produced for a company's stock, based upon the quality of its technology (i.e., based on the technological strengths of companies as measured using patent and R&D indicators). This valuation may be used to identify investment opportunities in the stock market. Specifically, companies whose Technology Stock Price is higher than their Current Stock Price at a particular point may be regarded as undervalued based on their technology, and therefore represent stock purchase opportunities. Conversely, companies whose Technology Stock Price is lower than their Current Stock Price may be regarded as overvalued, and are therefore candidates for selling of the stock.

The Technology Stock Prices can be displayed on summary reports for review by a client or their financial manager. Alternatively, amounts of company stock can be bought or sold from a stock portfolio in accordance with the company valuations. The client referred to here may be a potential or actual investor, a broker, a fund manager, or an automated trading system or the like.

BRIEF DESCRIPTION OF THE DRAWINGS

The foregoing summary, as well as the following detailed description of the preferred embodiments of the invention may be better understood when read in conjunction with the appended drawings. For the purpose of illustrating the present invention, the embodiments shown in the drawings are those which are presently preferred. It should be understood, however, that the invention is not limited to the precise arrangements and instrumentalities shown. In the drawings:

FIG. 2 is a table showing a sample of a database of patent and R&D indicators for a selection of U.S. publicly traded companies;

FIG. 4 illustrates a sample of an output report, listing companies whose stocks are undervalued, and the subsequent returns on those stocks.

DETAILED DESCRIPTION OF THE INVENTION

Certain terminology is used herein for convenience only and is not to be taken as a limitation on the present invention.

Figure 1:
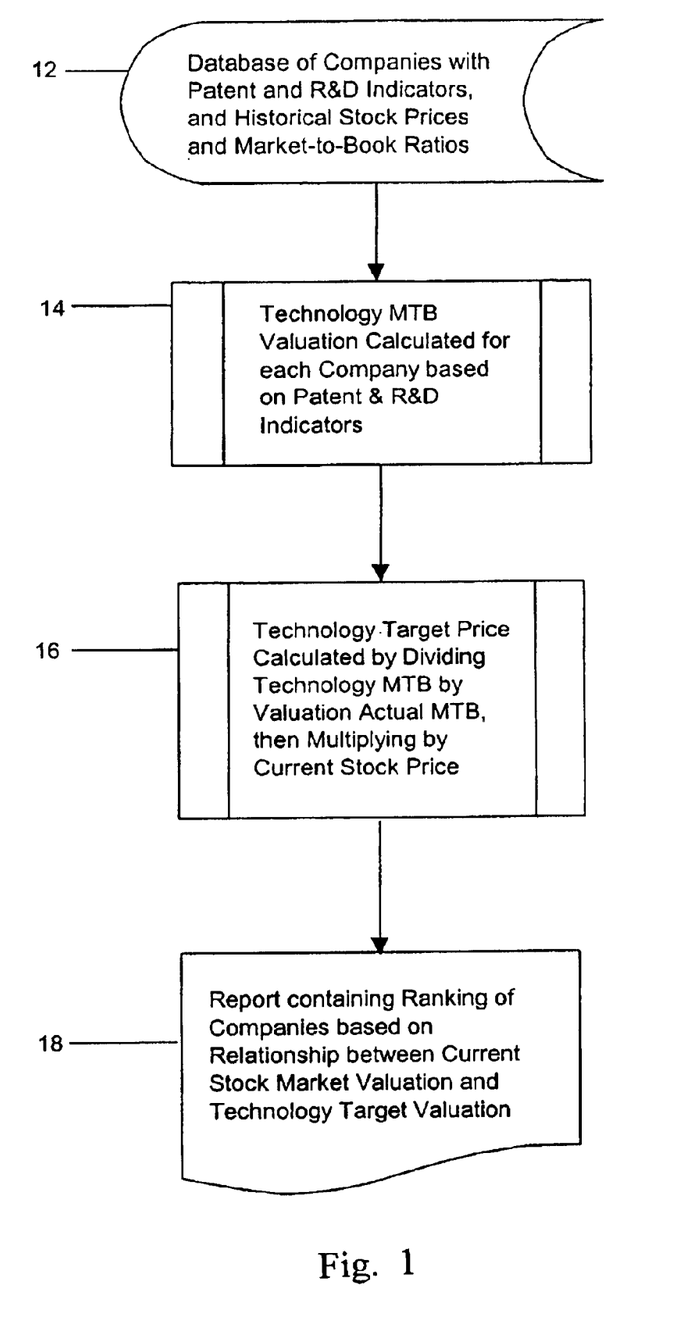
FIG. 1 is a flow diagram of the company valuation process of an embodiment of the present invention.

FIG. 1 is a combined flowchart/schematic block diagram of the elements of one embodiment of a system and method of the present invention through which indicators of technology quality and commitment to R&D can be used to produce company share price valuations. The system 10 preferably includes a database 12 containing patent and R&D indicators for publicly traded companies. The database 12 also preferably includes historical stock prices and market-to-book ratios.

A technology-based company market-to-book valuation 14 is derived or calculated based on the patent and/or R&D indicators. The technology-based company market-to-book valuation 14 is preferably compared to the current company market-to-book valuation to calculate a Technology Target Price (stock price target) 16. A report 18 may then be generated having companies ranked according to the relationship between their technology-based valuation and their current valuation.

The components of FIG. 1 are discussed in detail below. An example is used to show the operation of one embodiment of the system and method of the present invention. In this example, we use the companies and patent indicators in the publicly available Tech-Line® database of CHI Research, Inc. Tech-Line contains over 1400 companies with 50 or more US patents in the last 5 years. The Tech-Line database pieces together the corporate structure of each of these companies in order to produce accurate patent lists for each company, including all of their subsidiaries. This unification of the companies' various components includes a clean-up of patent assignee names, and a review for new mergers, acquisitions and divestitures. The system and method may also include the use of one or more databases containing patent information and related information from foreign countries.

Preferably, five indicators are used to evaluate company patent portfolios including:

Number of Patents (NUMPAT)

The number of patents granted to a company, including its subsidiaries, in the previous year. This indicator preferably provides a measure of the technological productivity of a company.

Patent Growth (GROWTH)

The percentage growth in the number of patents granted to a company in the previous year, compared to the year before. This indicator is preferably used to show trends in a company's commitment to technological innovation.

Current Impact Index (CII)

The Current Impact Index preferably shows the impact of a company's patents on the latest technological developments. The CII is a measure of how often the previous five years of a company's patents are cited by patents issued in the most recent year, relative to all US patents. A CII of 1.0 shows that the last five years of a company's patents are cited as often as expected, compared to all U.S. patents. A CII of 1.1 indicates 10 percent more citations per patent than expected, and so forth. Note that CII is a synchronous indicator, and moves with the current year, looking back five years. As a result, when a company's patents from recent years start to drop in impact, this is reflected as a decline in the current year's CII.

Science Linkage (SL)

Science Linkage is a measure of the extent to which a company's technology builds upon cutting-edge scientific research. Science Linkage is preferably calculated based on the average number of references on a company's patents to scientific papers, as distinct from references to previous patents. Companies whose patents cite a large number of scientific papers are assumed to be working closely with the latest scientific developments.

Technology Cycle Time (TCT)

The Technology Cycle Time is preferably used as a measure of the median age of the U.S. patents cited on the front page of a company's patents. A company that cites a large number of recent patents is likely to be innovating rapidly, whereas a tendency to cite older patents is an indication that a company utilizes older technology.

Patent indicators may vary greatly across industries. For example, in fast-moving industries such as electronics and semiconductors, the average Technology Cycle Time is around three years, while the average in a slower evolving industry such as shipbuilding is around fifteen years. Similarly, the average company in the biotechnology industry has a Science Linkage of 15, while the average automotive company has a Science Linkage of less than one. By removing the industry effects, the companies that have strong indicators relative to other companies in their industry can be identified. For example, an automotive company with a Science Linkage of four is more science linked relative to its industry than a biotechnology company with a Science Linkage of eight.

Industry-normalized indicators are preferably computed by taking the indicator value for each company and dividing by the average indicator value for the company's industry.

For example, if the companies in the chemical industry have an average Science Linkage of 3.7, then the normalized Science Linkage for a chemical company will be that company's Science Linkage divided by 3.7. Normalization helps to remove the industry effects from the technology indicators, and facilitates comparison of companies across industries. The industry-normalized indicators are:

1. Industry Normalized Number of Patents
2. Industry Normalized Patent Growth
3. Industry Normalized Current Impact Index
4. Industry Normalized Technology Cycle Time
5. Industry Normalized Science Linkage FIG. 2 shows a sample of a database containing both raw and normalized patent indicators for selected companies.

The five industry-normalized patent indicators, along with companies' R&D Intensity (R&D Expenditure/Sales) are preferably mapped against companies' stock market valuations using multiple regression analysis. R&D Intensity can be obtained from one or more publicly available market business information products. The dependent variable in the regression equation is the companies' market-to-book (MTB) ratio. The MTB measures the relationship between the Market Value of a company (Share Price×Number of Shares Outstanding) and its Book Value (the value of the assets it has on its balance sheet). For example, if a company has a Book Value of $10 million, and has 5 million outstanding shares priced at $4 each, it has an MTB of 2 ($20 million/$10 million). A high MTB shows a company that the market feels has value over and above the assets revealed on its balance sheet. This value may emerge in part from the quality of a company's technology, which is not explicitly shown on its balance sheet. Market-to-book may be obtained from one or more providers of stock market information.

Regression analysis is preferably used to identify the combination of patent and R&D indicators that is most closely related to companies' actual MTB valuations at a given point in time. The regression equation preferably takes the form:

$$MTB = a + b1 NUMPAT + b2\ GROWTH + b3 CII + b4 SL + b5 TCT + b6 R\&D$$

The regression analysis preferably calculates the coefficients a, b1, b2, b3, b4, b5 and b6, and therefore assigns a weighting to each technology indicator.

By entering the combination of patent indicators associated with a particular company into this equation, a value for the dependent variable is returned. This value is defined as the Technology MTB, and represents the valuation of the company based on its technology indicators. The formula for the Technology MTB is:

$$\text{Technology } MTB = a + b1 NUMPAT + b2\ GROWTH + b3 CII + b4 SL + b5 TCT + b6 R\&D$$

where the coefficients have been determined by the initial regression analysis. Preferably one or more of the weighting coefficients can be set to zero (0), effectively eliminating one or more indicators from the equation.

The relationship between the Actual MTB and Technology MTB of a company is used to generate a technology-based stock price forecasts, using the formula:

$$\text{Technology Stock Price} = (\text{Technology } MTB / \text{Actual } MTB) \times \text{Current Stock Price}$$

Using the earlier example, a company having a book value of $10 million, and a market value of $20 million (5 million shares at $4 each), therefore has an Actual MTB of 2 ($20 million/$10 million). If the Technology MTB of this company is calculated to be 4, the only way for the Actual MTB of the company to reach the Technology MTB is for its stock price to double, assuming a constant book value. The company would still have a book value of $10 million, but its market value would now be $40 million (5 million shares at $8 each), giving it an Actual MTB of 4 ($40 million/$10 million). The target price for this company's stock is therefore determined to be $8.

EXAMPLE

A database was constructed to show the operation of the system and method of the present invention. The database contains U.S. companies listed on the two major U.S. stock exchanges (New York Stock Exchange and NASDAQ) at the end of 1999 that had been granted at least 50 U.S. patents over the previous five years. The analysis was restricted to U.S. companies listed on U.S. exchanges to remove the effect of any differences among worldwide stock exchanges. The minimum patent threshold was used to focus the analysis on companies in which patents may be an important indicator of future success. The database contained 308 companies.

Patent data was collected for the 308 companies from the CHI Tech-Line database on an annual basis for the period from the end of 1990 to the end of 1998. For each company, this data included counts of patents and measures of patent growth, along with a number of patent citation indicators. The Tech-Line database divides patents into 30 technologies, and divides companies into 26 industry groups. It was therefore possible to normalize the patent data to account for differences across industries. The R&D data for the companies was taken from Schonfeld & Associates' R&D Ratios and Budgets database, available from Schonfeld & Associates, Inc., Riverwoods, Illinois. The 308 companies in the database were all in operation at the end of 1999, and had been granted at least 50 patents in the previous five years. However, not all of these companies were in the database for all years. The minimum number of companies in the database was 192 in 1990.

Nine separate regression analyses were carried out, one for the end of each year between 1990 and 1998. Hence nine regression equations were produced, each of the form:

$$MTB = a + b1 NUMPAT + b2\ GROWTH + b3 CII + b4 SL + b5 TCT + b6 R\&D$$

The regression analysis revealed that the number of patents and patent growth were not significantly related to companies' market-to-book ratios. The coefficients b1 and b2 were therefore set to zero and the regressions were re-run. Setting the coefficient associated with the number of patents to zero means that there is no inherent bias in the model towards large companies with extensive patent portfolios. The model depends on the quality of companies' patent portfolios, not their size.

The coefficients a, b3, b4, b5 and b6 changed each year. However, there was a high degree of consistency across years. The signs of the coefficients were often the same in each year. In most cases, there were positive coefficients for CII, SL and R&D, showing that R&D intensive companies with highly cited, highly science-linked patents tend to have higher market-to-book valuations. In most years, there was also a negative coefficient for TCT, showing that companies that innovate quickly tend to have higher market-to-book valuations. However, the TCT coefficient was less stable than those of the other patent quality indicators.

Due to the consistency of the coefficients, it was possible to combine them to produce a single regression equation that related patent indicators to MTB valuations for the period 1990–98. The initial coefficients for this equation were the means of the coefficients from the nine models. Sensitivity analysis was then carried out on the equation, with each of the coefficients being changed up to 10% in each direction to establish whether alternative equations would produce values that correlated more closely with actual MTB values. Small changes were made in the coefficients as a result of this analysis. The final equation produces an MTB valuation for a company based on an input of its patent indicators and R&D intensity. This valuation is defined as the Technology MTB. The formula for the Technology MTB in this example database is:

$$\text{Technology } MTB = EXP(0.4 + 0.4 \times CII + 0.03 \times SL + 0.01 \times R\&D)$$

Since the Technology MTB valuations have their foundation in mapping patent indicators against Actual MTB valuations, it might be expected that these two valuations of companies would be similar. However, multiple regression fits a single model to all cases, so that each case has a residual term associated with it. Based upon this residual, it is possible to define whether the company, based upon its technology, is overvalued (Actual MTB>Technology MTB) or undervalued (Technology MTB>Actual MTB).

Figure 3:
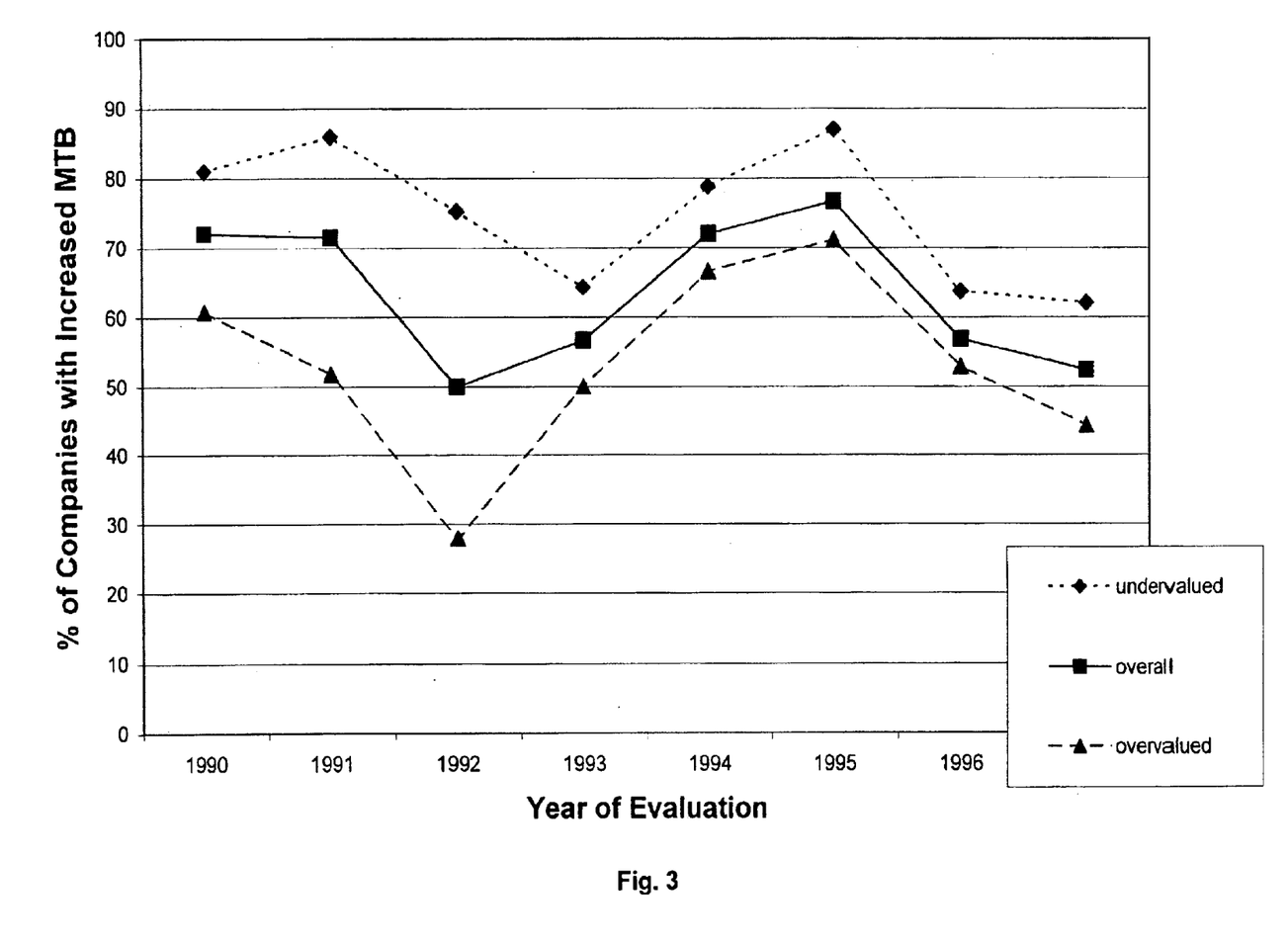
FIG. 3 is a graph showing changes in market-to-book valuations of companies defined as undervalued or overvalued.

Two separate analyses were carried out to test the ability of the system to forecast future changes in stock market valuations. The first analysis concentrated on market-to-book valuations. It was based on defining companies as undervalued or overvalued using the system and method described above, and determining whether their market-to-book valuation two years later changed in the direction indicated. The market-to-book valuation of undervalued companies should rise relative to the overall market, while the valuation of the overvalued companies should fall relative to the market. FIG. 3 shows the results of this analysis.

The line marked 'Overall' in FIG. 3 is a measure of the strength of the stock market. In a strong market, a high percentage of companies experience increased market-to-book valuations, due to increases in their stock price. For example, just over 70% of the companies in the model at the end of 1990 had higher market-to-book valuations two years later, suggesting that the stock market was on an upward trend during that period. However, if these companies are split into two groups—undervalued and overvalued—the forecasting power of the technique becomes clear. Over 80% of the companies defined as undervalued at the end of 1990 had a higher market-to-book two years later, compared to only 60% of overvalued companies.

This pattern has been the same throughout the last decade. As FIG. 4 shows, each year the percentage of companies defined as undervalued that have higher market-to-book valuations two years later is greater than the percentage of overvalued companies with increased market-to-book over the same period. This pattern occurs in strong markets (where a high overall percentage of companies experience increased market-to-book) and weaker markets (in which a lower percentage of all companies experience increased market-to-book).

This result suggests that the model can provide help in forecasting future changes in market-to-book valuations. However, it is not market-to-book ratios that are of direct interest to stock market analysts. Their primary interest is changes in stock prices. A second analysis was therefore undertaken to test whether the model could be used to forecast stock price changes.

Those companies that are defined as the most undervalued and overvalued are of particular interest. To identify these companies, all companies in the sample were placed into percentiles according to their Technology MTB (as shown in FIG. 4), with a value of 100 assigned to the company with the highest Technology MTB, and a value of 1 to the company with the lowest Technology MTB. Companies were then placed into percentiles according to their Actual MTB, with 100 representing the highest Actual MTB and 1 representing the lowest Actual MTB.

For each company, the Actual MTB Percentile was subtracted from the Technology MTB Percentile. Companies were then placed into percentiles on the basis of the resultant differential, to produce the Valuation Percentile of each company. The highest Valuation Percentile (100) was assigned to the companies with the largest positive differential. The Technology MTB Percentile of these companies exceeded their Actual MTB Percentile by the largest amount. These companies were therefore the most undervalued in the sample. The lowest Valuation Percentile (1) was assigned to the most overvalued companies in the sample, whose Actual MTB Percentile exceeded their Technology MTB Percentile by the largest amount.

The Valuation Percentile of a company is a guide to how its valuation in the stock market compares to a valuation of the company based solely upon its technology. A company with a Valuation Percentile of 100 has strong technology that is not recognized by the stock market. Meanwhile, a company with a Valuation Percentile of 1 has a valuation in the market that cannot be justified on the basis of its technology (although there may be other factors that explain its high valuation). A company with a Valuation Percentile of 50 is regarded as fairly valued, based upon the quality of its technology.

Figure 5:
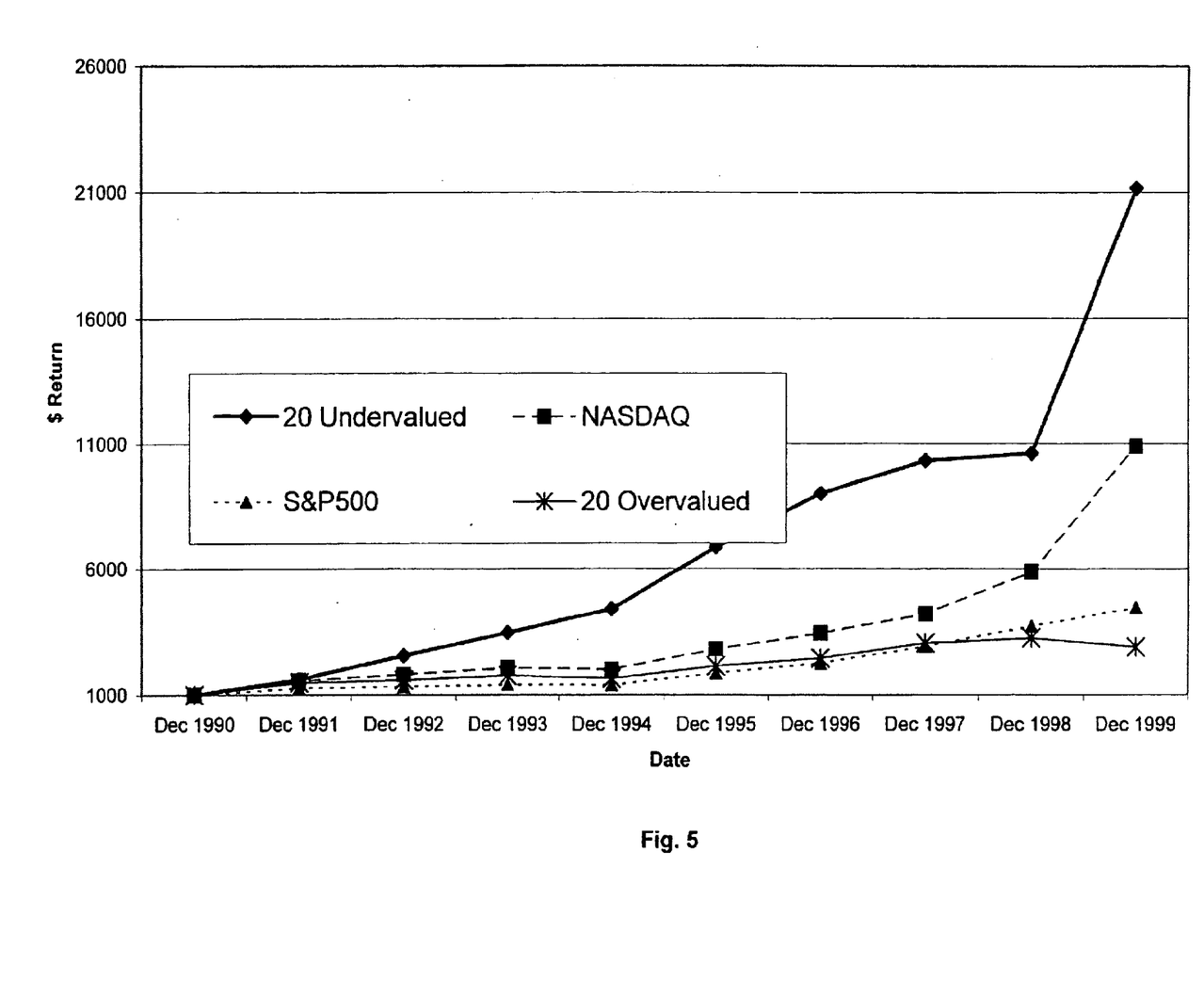
FIG. 5 is a graph showing the cumulative annual returns on portfolios containing the most undervalued and most overvalued stocks.

FIG. 5 is a graph which shows the returns that investors would have received if they had invested equal dollar amounts in two annually updated portfolios—the 20 most undervalued companies and the 20 most overvalued companies. Each year the portfolio is sold, and the funds invested in the new portfolio of stocks. FIG. 5 reveals that an investment of $1000 in December 1990 in an annually updated portfolio of the 20 most undervalued stocks would have returned over $21,000 by December 1999. This portfolio would have significantly outperformed both the NASDAQ Composite Index and the S&P 500. Meanwhile, the portfolio of overvalued stocks would have returned only $3000 over the same period, underperforming both the NASDAQ and the S&P 500.

Alternative Embodiment 1

Patent indicators alone were used as a test case and for the purposes of illustration. The addition of indicators, including traditionally used financial indicators, to the underlying database and valuation equation will improve the results.

Alternative Embodiment 2

Alternative methods for deriving the weighting coefficients for the technology indicators may be used, such as Linear Programming, Dynamic Programming, Monte Carlo method, or other optimization methods.

Alternative Embodiment 3

In one embodiment, the technology indicator with the highest weighting is the Current Impact Index (CII). This indicator measures the impact of a company's patents on later patents. In a preferred embodiment, the CII is split into internal and external elements. Internal CII preferably measures the extent to which a company builds on its own technology, while External CII evaluates the extent to which other companies build on a company's patents. Splitting the CII into two parts will enable these two distinct elements of patent impact to be entered into the model separately.

Alternative Embodiment 4

The embodiments discussed above use the Tech-Line patent indicators for illustration. One or more other patent, financial or other indicators may be used to increase the precision of the model. These indicators can include citation frequency, citations per patent, citation percentile, number of claims, average length of claims, number of foreign filings and grants, and the like. The additional indicators can also be normalized by industry.

Alternative Embodiment 5

The embodiments of the system and method described above may also include production of an output report for consideration by an investor or fund manager. The output may also be in the form of a direct signal to an automated trading system to buy and sell shares.

The present invention may be implemented with any combination of hardware and software. If implemented as a computer-implemented apparatus, the present invention is implemented using means for performing all of the steps and functions described above. The present invention can also be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Although the description above contains many specific details, these should not be construed as limiting the scope of the invention but as merely providing illustrations of some of the presently preferred embodiments of this invention. For example, the underlying patent database need not be constrained to U.S. patents, the companies need not be constrained to companies listed in U.S. exchanges, and the patent and financial indicators need not be restricted to those used above. Thus, the scope of the invention should be determined by the appended claims and their legal equivalents, rather than by the examples given.

What is claimed is:

1. A computer-implemented method of managing a portfolio containing stock of one or more companies, the method comprising:

calculating in a computer a technology market-to-book (MTB) value for one or more companies of the portfolio using the equation:

Technology $MTB = a + b1 NUMPAT + b2\ GROWTH + b3 CII + b4 SL + b5 TCT + b6 R\&D$ wherein NUMPAT is the number of patents granted indicator, GROWTH is the percentage growth indicator, CII is a current impact index patent indicator, SL is a science linkage patent indicator, TCT is a technology cycle time patent indicator, R&D is a research and development intensity value, and a, b1, b2, b3, b4, b5 and b6 are weighting coefficients;

calculating in a computer the technology stock price for the one or more companies of the portfolio using the equation Technology Stock Price=(Technology $MTB$/actual $MTB$)×current stock price;

and automatically generating a recommendation for buying or selling stock for the portfolio based on the calculated technology stock prices.

2. The method of claim 1 further comprising:

transmitting the recommendation to buy or sell a company's stock to a trade execution computer which automatically executes a trade based on the recommendation.

3. The method of claim 1 wherein the company's valuation is used to determine whether a company is overvalued or undervalued, the method further comprising:

comparing the Technology MTB valuation to an actual MTB valuation for a company to determine whether the company is overvalued or undervalued.

4. The method of claim 1 wherein the weighting coefficients are determined using at least one method selected from the group comprising, the Monte Carlo method, a filtering algorithm or an optimization method.

5. The method of claim 1 wherein the weighting coefficients are determined using multiple regression of independent variables against companies' actual market-to-book valuations.

6. The method of claim 1 wherein the step of calculating the technology MTB further comprises using additional indicators comprising at least one of citation frequency, citations per patent, citation percentile, number of claims, average length of claims and number of foreign filings and grants.

7. The method of claim 1 wherein one or more of the weighting coefficients are set to zero, eliminating one or more indicators from the equation.

8. The method of claim 1 wherein the patent indicators are normalized to account for differences between industries.

9. The method of claim 1 wherein the CII indicator comprises an internal CII and an external CII.

10. A computer-implemented system for managing a portfolio containing stock of one or more companies, the system comprising:

means for calculating a technology market-to-book (MTB) value for one or more companies of the portfolio using the equation:

Technology $MTB = a + b1 NUMPAT + b2\ GROWTH + b3 CII + b4 SL + b5 TCT + b6 R\&D$ wherein NUMPAT is the number of patents granted indicator, GROWTH is the percentage growth indicator, CII is a current impact index patent indicator, SL is a science linkage patent indicator, TCT is a technology cycle time patent indicator, R&D is a research and development intensity value, and a, b1, b2, b3, b4, b5, and b6 are weighting coefficients;

means for calculating the technology stock price for the one or more companies of the portfolio using the equation Technology Stock Price=(Technology $MTB$/actual $MTB$)=current stock price;

and means for automatically generating a recommendation for buying or selling stock for the portfolio based on the calculated technology stock prices.

11. The system of claim 10 further comprising:

means for transmitting the recommendation to buy or sell a company's stock to a trade execution computer which automatically executes a trade based on the recommendation.

12. The system of claim 10 wherein the company's valuation is used to determine whether a company is overvalued or undervalued, the system further comprising:

means for comparing the Technology MTB valuation to an actual MTB valuation for a company to determine whether the company is overvalued or undervalued.

13. The system of claim 10 wherein the weighting coefficients are determined using at least one method selected from the group comprising, the Monte Carlo method, a filtering algorithm or an optimization method.

14. The system of claim 10 wherein the weighting coefficients are determined using multiple regression of independent variables against companies' actual market-to-book valuations.

15. The system of claim 10 wherein the means for calculating the technology MTB further comprises means for using additional indicators comprising at least one of citation frequency, citations per patent, citation percentile, number of claims, average length of claims and number of foreign filings and grants.

16. The system of claim 10 wherein one or more of the weighting coefficients are set to zero, eliminating one or more indicators from the equation.

17. The system of claim 10 wherein the patent indicators are normalized to account for differences between industries.

18. The system of claim 10 wherein the CII indicator comprises an internal CII and an external CII.

19. An article of manufacture for managing a portfolio containing stock of one or more companies, the article of manufacture comprising a computer-readable medium holding computer-executable instructions for performing a method comprising:

calculating a technology market-to-book (MTB) value for one or more companies of the portfolio using the equation:

Technology $MTB = a + b1 NUMPAT + b2\ GROWTH + b3 CII + b4 SL + b5 TCT + b6 R\&D$ wherein NUMPAT is the number of patents granted indicator, GROWTH is the percentage growth indicator, CII is a current impact index patent indicator, SL is a science linkage patent indicator, TCT is a technology cycle time patent indicator, R&D is a research and development intensity value, and a, b1, b2, b3, b4, b5 and b6 are weighting coefficients;

calculating the technology stock price for the one or more companies of the portfolio using the equation:

Technology Stock Price=(Technology $MTB$/actual $MTB$)×current stock price;

and automatically generating a recommendation for buying or selling stock for the portfolio based on the calculated technology stock prices.

20. The article of manufacture according to claim 19 the computer-executable instructions performing a method further comprising:

transmitting the recommendation to buy or sell a company's stock to a trade execution computer which automatically executes a trade based on the recommendation.

21. The article of manufacture according to claim 19 wherein the company's valuation is used to determine whether a company is overvalued or undervalued, the computer-executable instructions performing a method further comprising:

comparing the Technology MTB valuation to an actual MTB valuation for a company to determine whether the company is overvalued or undervalued.

22. The article of manufacture according to claim 19 wherein the weighting coefficients are determined using at least one method selected from the group comprising, the Monte Carlo method, a filtering algorithm or an optimization method.

23. The article of manufacture according to claim 19 wherein the weighting coefficients are determined using multiple regression of independent variables against companies' actual market-to-book valuations.

24. The article of manufacture according to claim 19 wherein the step of calculating the technology MTB further comprises using additional indicators comprising at least one of citation frequency, citations per patent, citation percentile, number of claims, average length of claims and number of foreign filings and grants.

25. The article of manufacture according to claim 19 wherein one or more of the weighting coefficients are set to zero, eliminating one or more indicators from the equation.

26. The article of manufacture according to claim 19 wherein the patent indicators are normalized to account for differences between industries.

27. The article of manufacture according to claim 19 wherein the CII indicator comprises an internal CII and an external CII.

* * * * *

UNITED STATES PATENT AND TRADEMARK OFFICE
CERTIFICATE OF CORRECTION

PATENT NO.     : 6,832,211 B1
DATED          : December 14, 2004
INVENTOR(S)    : Patrick Thomas It is certified that error appears in the above-identified patent and that said Letters Patent is hereby corrected as shown below:

Title page,
Item [75], Inventors, please delete "Francis Narin".

Signed and Sealed this

Eighth Day of March, 2005

JON W. DUDAS
*Director of the United States Patent and Trademark Office*